US005530930A

United States Patent [19]

Hahn

[11] Patent Number: 5,530,930

[45] Date of Patent: Jun. 25, 1996

[54] STEP COUNTER USABLE AS POCKET PAGING RECEIVER AND METHOD FOR CONTROLLING THE SAME

[75] Inventor: Dong K. Hahn, Seoul, Rep. of Korea

[73] Assignee: Hyundai Electronics Industries, Co., Ltd., Kyoungki-do, Rep. of Korea

[21] Appl. No.: 252,792

[22] Filed: Jun. 2, 1994

[30] Foreign Application Priority Data

Jun. 9, 1993 [KR] Rep. of Korea .................... 93-10404

[51] Int. Cl.[6] .................... H04B 1/06; G01C 21/00

[52] U.S. Cl. .................... 455/344; 455/89; 455/90; 455/351; 379/56; 377/24.2; 340/825.44

[58] Field of Search .................... 455/344, 89, 90, 455/346, 347, 348, 349, 350, 351; 340/311.1, 522, 825.44, 825.65; 379/56, 58, 60; 128/774, 782; 377/24.2

[56] References Cited

U.S. PATENT DOCUMENTS 4,571,680 2/1986 Wu .................... 364/410
5,117,449 5/1992 Metroka et al. .................... 379/58
5,125,412 6/1992 Thornton .................... 128/670
5,138,312 8/1992 Tsukamoto et al. .................... 340/825.44
5,148,473 9/1992 Freeland et al. .................... 379/59
5,365,226 11/1994 Morishima .................... 340/825.44
5,404,385 4/1995 Ben-Haim .................... 377/24.2

FOREIGN PATENT DOCUMENTS 57-8512 1/1982 Japan .
63-60931 11/1988 Japan .

*Primary Examiner*—Reinhard J. Eisenzopf
*Assistant Examiner*—Lee Nguyen
*Attorney, Agent, or Firm*—Saliwanchik & Saliwanchik

[57] ABSTRACT

A step counter usable as a pocket paging receiver wherein many parts thereof are used as those of the pocket paging receiver, thereby capable of reducing the cost of manufacture and improving the utility. The step counter includes a control circuit for determining whether input data received in the step counter is data for a radio-paging mode or data for a step-counting mode, storing the input data when the input data is data for the radio-paging mode, sensing the input data as walking data when the input data is data for the step-counting mode, accumulatively counting the number of steps, and storing the resultant value, determining whether the step counter operates in the radio-paging mode or the step-counting mode, and transmitting the stored data corresponding to the determined mode to a display equipped in the step counter.

2 Claims, 4 Drawing Sheets

STEP COUNTER USABLE AS POCKET PAGING RECEIVER AND METHOD FOR CONTROLLING THE SAME

BACKGROUND OF THE INVENTION

1. Field of the Invention

The present invention relates to a step counter, and more particularly to a step counter usable as a pocket paging receiver and a method for controlling the same.

2. Description of the Prior Art

Generally, pocket paging receivers have been well known in the technical field as being adapted to receive a message from a counterpart in case of, for example, urgency. One example of such a paging receiver is disclosed in Japanese Patent Publication No. Sho 63-60931. As shown in FIG. 1, the paging receiver disclosed in the publication includes a signal processing circuit 43 operable in at least one of two operation modes, namely, a first mode and a second mode. In the first mode, the signal processing circuit 43 processes a current call number signal obtained from a first call signal so as to generate a first processing signal while processing at least one of a current message signal and a current call number signal obtained from a second call signal so as to generate a second processing signal. In the second mode, the signal processing circuit 43 serves to process at least one of message signals of previous call signals and the current message signal, thereby generating a third processing signal. The paging receiver further includes an audible signal generator 60 adapted to selectively respond to one of a drive signal and the first to three processing signal so as to generate an audible signal, and a display 62 adapted to respond to the first processing signal, a composite signal of the second processing signal with data signal, and the third processing signal so as to provide a visual display for the beeper.

On the other hand, step counters have been well known as being adapted to count the number of steps when a user walks or runs. Such step counters can be used as means for managing a user's health in that the user can check the number of steps for a predetermined period while walking. One example of such step counters is disclosed in Japanese Utility Model Laid-open Publication No. Sho 57- 8512. As shown in FIGS. 2A and 2B, the step counter disclosed in the publication is of the pocket type including a pencil-shaped case 1, a display 2 mounted on the case 1 and adapted to display the number of steps and the walked distance, a clip 3 attached to the case 1, and a drive switch 4 for actuating a counting circuit 7 adapted to count the number of steps and calculate the walked distance.

Although the above-mentioned paging receiver and step counter have been developed and used individually as independent goods, they have many common parts in terms of functional characteristics.

BRIEF SUMMARY OF THE INVENTION

Therefore, an object of the invention is to provide a step counter usable as a pocket paging receiver wherein many parts thereof are used as those of the pocket paging receiver, thereby capable of reducing the manufacture cost and improving the utility.

Another object of the invention is to provide a method for controlling a step counter having a radio-paging function.

In accordance with one aspect, the present invention provides a step counter for counting the number of steps when a user is walking while carrying the step counter, comprising: an antenna for receiving a signal indicative of a message for radio paging; a radio frequency amplifier circuit for amplifying a radio frequency component of the signal received by the antenna; a mixer circuit for mixing the amplified radio frequency signal from the radio frequency amplifier circuit with an oscillation signal generated from an oscillator circuit and converting the resultant signal into an intermediate frequency signal; an intermediate frequency detector circuit for detecting the intermediate frequency signal from the mixer circuit and amplifying it; a decoder circuit for decoding the intermediate frequency signal detected by the intermediate frequency detector circuit and thereby generating a signal processable in an operating system of the step counter; a battery for supplying an electric power to the control circuit; a step-counting sensor circuit for sensing walking data generated when the user carrying the step counter is walking, accumulatively counting the number of steps upon sensing the walking data, and sending the resultant value to the control circuit; a selection switch circuit for selecting one of a step-counting function and a radio-paging function in accordance with a user's desire; a memory circuit stored with an identifier for discriminating whether the received message is required to be stored in the control circuit; a control circuit for controlling the overall system processing operation of the step counter, storing the output signal from the decoder circuit when the received message corresponds to the identifier stored in the memory circuit, and storing the counted value from the step-counting sensor circuit; and a display for selectively informing a user of the stored data indicative of the received message and the counted number of steps, under a control of the control circuit.

In accordance with another aspect, the present invention provides a method for controlling a step counter having a radio-paging function, comprising the steps of: (a) determining whether input data received in the step counter being at a power-on state is data for a radio-paging mode or data for a step-counting mode; (b) determining whether the input data corresponds to an identifier stored in a memory circuit equipped in the step counter when the input data has been determined as the data for the radio-paging mode at the step (a) and storing the input data when it corresponds to the identifier; (c) sensing the input data as walking data when the input data has been determined as the data for the step-counting mode at the step (a), accumulatively counting the number of steps, and storing the resultant value; and (d) determining whether the step counter operates in the radio-paging mode or the step-counting mode, and transmitting the stored data corresponding to the determined mode to a display equipped in the step counter.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENT

Figure 1:
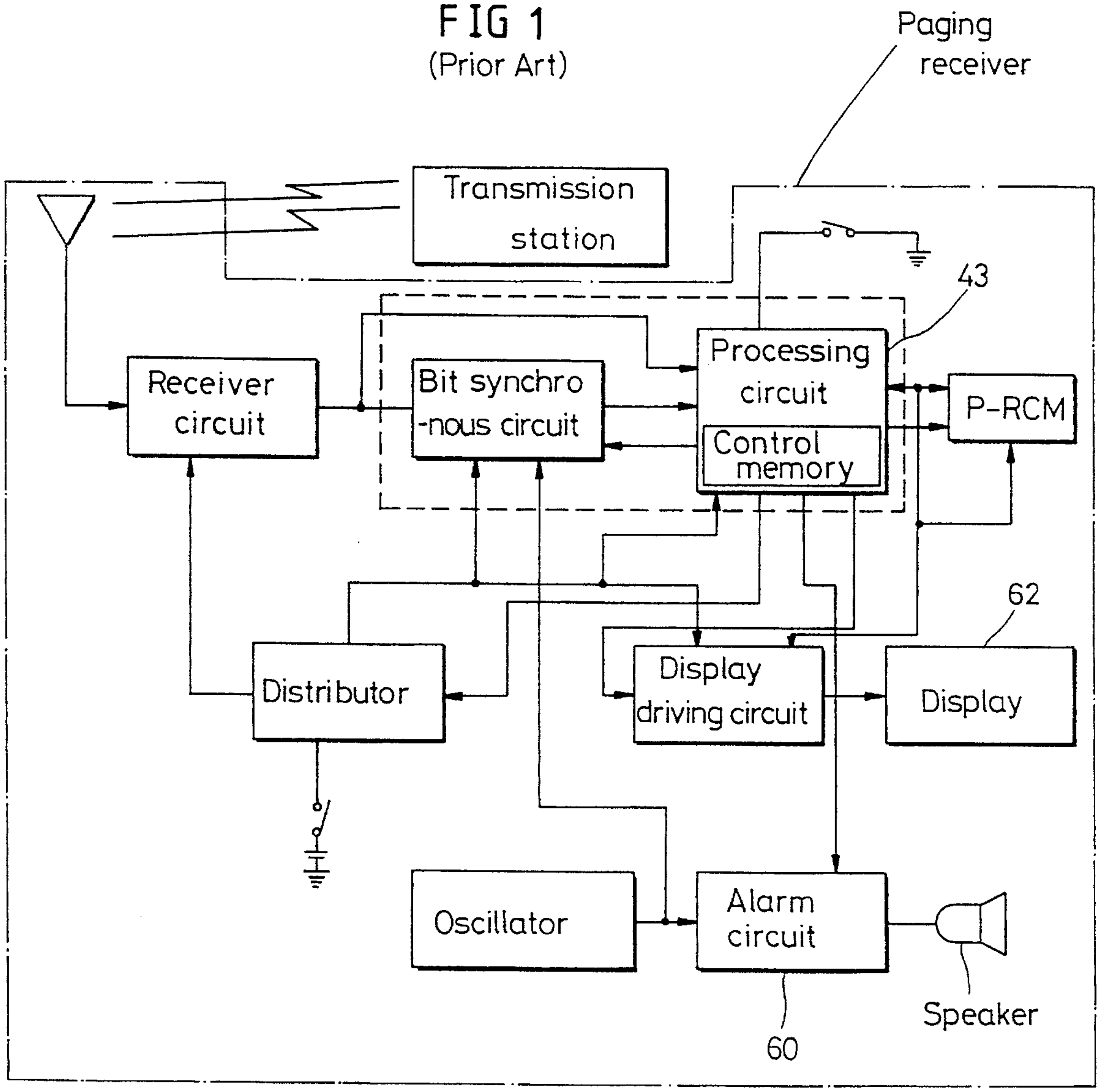
FIG 1 (Prior Art)
FIG. 1 is a block diagram of a conventional pocket paging receiver.
Figure 2A:
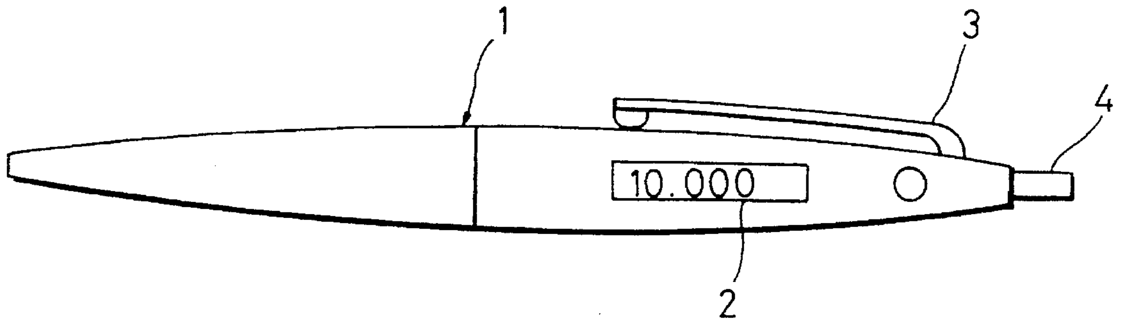
FIG. 2A (Prior Art)
FIG. 2A is a side view of a conventional pencil-shaped step counter.
Figure 2B:
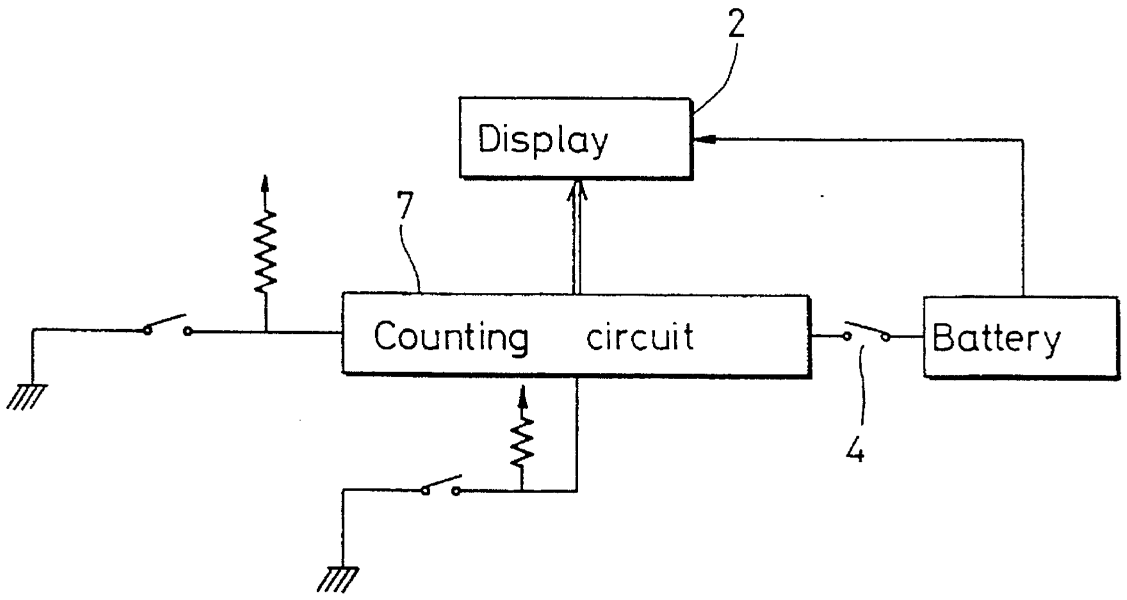
FIG. 2B (Prior Art)
FIG. 2B is a block diagram of the step counter shown in FIG. 2A.
Figure 3:
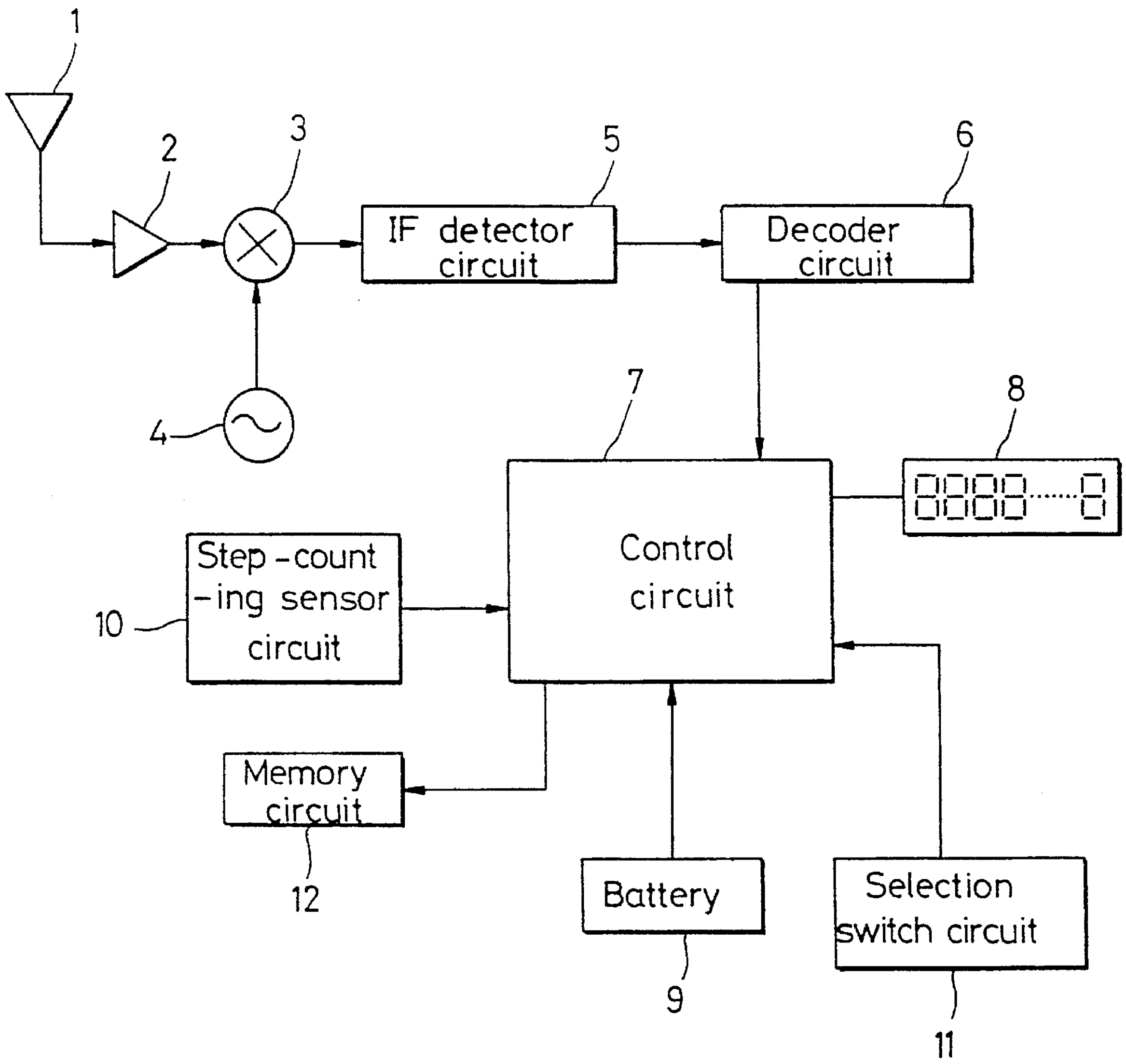
FIG. 3 is a block diagram of a step counter having a radio-paging function in accordance with the present invention.

Referring to FIG. 3, there is illustrated a step counter with a radio-paging function in accordance with the present invention. As shown in FIG. 3, the step counter comprises an antenna 1 for receiving a signal indicative of a message for radio paging, a radio frequency (RF) amplifier circuit 2 for amplifying a RF component of the signal received by the antenna 1, a mixer circuit 3 for mixing the amplified RF signal from the RF amplifier circuit 2 with an oscillation signal generated from an oscillator circuit 4 and converting the resultant signal into an intermediate frequency (IF) signal, an IF detector circuit 5 for detecting the IF signal from the mixer circuit 3 and amplifying it, and a decoder circuit 6 for decoding the IF signal detected by the IF detector circuit 5 and thereby generating a signal processable in the overall operating system of the step counter. A control circuit 7 is also provided for controlling the overall system processing operation, based on the processable signal from the decoder circuit 6. The control circuit 7 stores the output signal from the decoder circuit 6 therein when the received message is required to be stored. The control circuit 7 also stores the number of steps the user walks while carrying the step counter. The step counter further comprises a display 8 for selectively informing a user of the message stored and the number of steps stored, under a control of the control circuit 7, a battery 9 for supplying electric power to the control circuit 7, a step-counting sensor circuit 10 for sensing walking data generated when the user carrying the step counter is walking, accumulatively counting the number of steps upon sensing the walking data, and storing the resultant value, a selection switch circuit 11 for selecting one of a step-counting function and a paging function in accordance with the user's desire, and a memory circuit 12 stored with an identifier for discriminating whether the received message is required to be stored in the control circuit 7.

Operation of the step counter having the above-mentioned construction will now be described in detail.

Where a message is transmitted from a transmitter for radio-paging to the step counter, it is received in the antenna 1 of the step counter. The RF amplifier circuit 2 receives the signal from the antenna 1 and amplifies the RF component of the received signal. The resultant signal from the RF amplifier circuit 2 is sent to the mixer circuit 3 which, in turn, mixes the received signal with a RF-oscillating signal generated from the oscillation circuit 4, thereby generating an IF signal. The IF detector circuit 5 detects the generated IF signal and amplifies it. The amplified signal from the IF detector circuit 5 is received in the decoder circuit 6 and then decoded to a signal interpretable by the control circuit 7. The interpretable signal is then stored in the control circuit 7. When the user selects the radio-paging function through the selection switch circuit 11, the message stored in the control circuit 7 is displayed on the display 8 so that the user can be informed of the message.

On the other hand, the step-counting sensor circuit 10 operates while the user walks carrying the step counter to sense walking data generated when the user is walking and accumulatively counts the number of steps. The resultant value is sent to and stored in the control circuit 7. This procedure is repeated until the number of steps counted reaches a predetermined value, for example, corresponding to 10,000 steps. This step-counting operation of the step-counting sensor circuit 10 is well known in the technical field and, therefore, its detailed description is made no longer.

Where the user selects the step-counting function through the selection switch circuit 11, the data stored in the control circuit 7 is displayed on the display 8.

Figure 4:
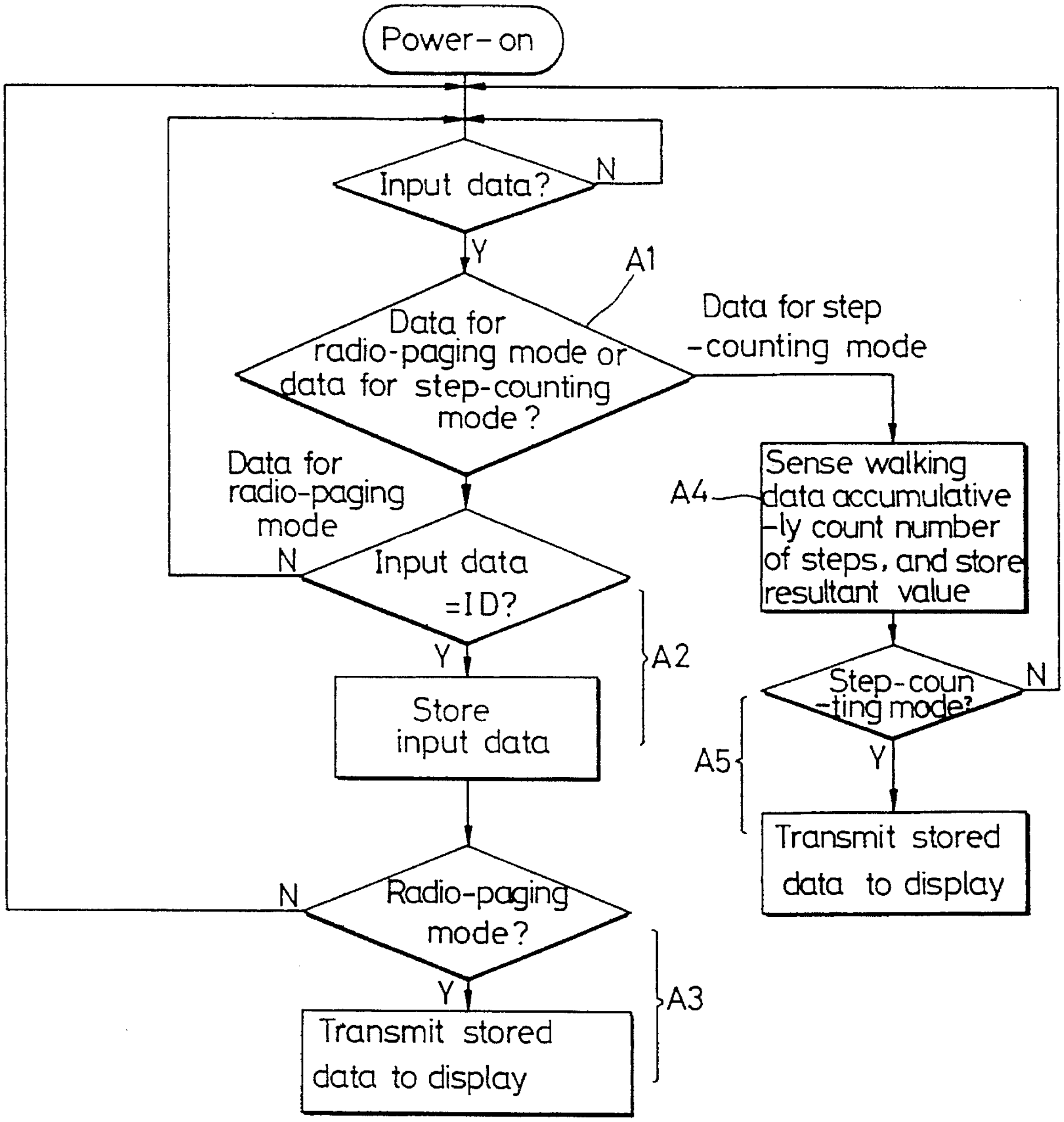
FIG. 4 is a flow chart illustrating a method for controlling the step counter shown in FIG. 3 in accordance with the present invention.

Now, operation of the control circuit 7 of FIG. 3 for controlling the above-mentioned operation of the step counter will be described, in conjunction with FIG. 4.

When input data is received in the step counter at a power-on state, a determination is first made about whether the input data is data for the radio-paging mode or data for the step-counting mode at step A1. Where the input data is data for the radio-paging mode, a determination is made about whether the input data has the same identifier as that stored in the memory circuit 11 at step A2. Thereafter, the input data is stored when it has the same identifier as that stored in the memory circuit 12. If the radio-paging mode is selected through the selection switch circuit 11 after the storage of the input data, then the stored data is transmitted to the display 8 at step A3 so that it can be displayed. On the other hand, when the input data has been determined as data for the step-counting mode at step A1, walking data generated when the user is carrying the step counter while walking is sensed by the step-counting sensor circuit 10 at step A4. Based on the sensed walking data, the number of steps is also accumulatively counted. At step A4, the resultant value is stored in the control circuit 7. In this case, when the step-counting mode is selected through the selection switch circuit 11 after the storage of the data, the stored data is transmitted to the display 8 at step A5 so that it can be displayed.

As apparent from the above description, the present invention provides a step counter having a radio-paging function so as to be usable as a pocket paging receiver. Since many parts of the step counter are used as those of the pocket paging receiver in accordance with the present invention, it is possible to reduce the manufacture cost and improve the utility.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A step counter for counting the number of steps when a user is walking and a pager function operative while carrying the step counter, comprising:

an antenna for receiving a signal indicative of a message for radio paging;

a radio frequency amplifier circuit for amplifying a radio frequency component of the signal received by the antenna;

a mixer circuit for mixing the amplified radio frequency signal from the radio frequency amplifier circuit with an oscillation signal generated from an oscillator circuit and converting the resultant signal into an intermediate frequency signal;

an intermediate frequency detector circuit for detecting the intermediate frequency signal from the mixer circuit and amplifying it;

a decoder circuit for decoding the intermediate frequency signal detected by the intermediate frequency detector circuit and thereby generating a signal processable in an operating system of the step counter;

a battery for supplying electric power;

a step-counting sensor circuit for sensing walking data generated when the user carrying the step counter is walking, accumulatively counting the number of steps upon sensing the walking data, and sending the resultant value to a control circuit;

a selection switch circuit for selecting one of a step-counting function and a radio-paging function in accordance with a user's desire;

a memory circuit, under the control of a control circuit, wherein said control circuit refers to an identifier stored in said memory circuit, for discriminating whether the received message is required to be stored in the control circuit;

the control circuit for controlling the overall system processing operation of the step counter, storing the output signal from the decoder circuit when the received message corresponds to the identifier stored in the memory circuit, and storing the counted value from the step-counting sensor circuit; and a display for selectively informing a user of the data stored in said control circuit indicative of the received message and the counted number of steps, under control of the control circuit.

2. A method for controlling a step counter having a radio-paging function, comprising the steps of:

(a) receiving input paging or step counting data and determining whether input data received in the step counter being at a power-on state is data for a radio-paging mode or data for a step-counting mode;

(b) determining whether the input data corresponds to an identifier stored in a memory circuit equipped in the step counter when the input data has been determined as the data for the radio-paging mode at the step (a) and storing the input data when it corresponds to the identifier;

(c) sensing the input data as walking data when the input data has been determined as the data for the step-counting mode at the step (a), accumulatively counting the number of steps, and storing the resultant value; and (d) determining whether the step counter operates in the radio-paging mode or the step-counting mode, and transmitting the stored data corresponding to the determined mode to a display equipped in the step counter.

* * * * *

UNITED STATES PATENT AND TRADEMARK OFFICE

CERTIFICATE OF CORRECTION

PATENT NO. : 5,530,930

DATED : June 25, 1996

INVENTOR(S) : Dong K. Hahn

It is certified that error appears in the above-indentified patent and that said Letters Patent is hereby corrected as shown below:

Column 4, Line 18: "circuit 11 at step A2" should read --circuit 12 at step A2--.

Signed and Sealed this

Twenty-fourth Day of September, 1996

*Attest:*

BRUCE LEHMAN

*Attesting Officer*

*Commissioner of Patents and Trademarks*